(12) United States Patent
Jeong et al.

(10) Patent No.: US 11,044,472 B2
(45) Date of Patent: Jun. 22, 2021

(54) METHOD AND APPARATUS FOR PERFORMING ADAPTIVE FILTERING ON REFERENCE PIXELS BASED ON SIZE RELATIONSHIP OF CURRENT BLOCK AND REFERENCE BLOCK

(71) Applicant: INDUSTRY-UNIVERSITY COOPERATION FOUNDATION HANYANG UNIVERSITY, Seoul (KR)

(72) Inventors: Je Chang Jeong, Seoul (KR); Ki Baek Kim, Seoul (KR); Jung Hyun Lee, Seoul (KR)

(73) Assignee: INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 0 days.

(21) Appl. No.: 16/475,266

(22) PCT Filed: Jan. 2, 2018

(86) PCT No.: PCT/KR2018/000059
§ 371 (c)(1),
(2) Date: Jul. 1, 2019

(87) PCT Pub. No.: WO2018/124853
PCT Pub. Date: Jul. 5, 2018

(65) Prior Publication Data
US 2019/0335171 A1    Oct. 31, 2019

(30) Foreign Application Priority Data

Jan. 2, 2017 (KR) .................. 10-2017-0000445
Dec. 29, 2017 (KR) .................. 10-2017-0183667

(51) Int. Cl.
*H04N 19/117* (2014.01)
*H04N 19/105* (2014.01)
(Continued)

(52) U.S. Cl.
CPC ......... *H04N 19/117* (2014.11); *H04N 19/105* (2014.11); *H04N 19/14* (2014.11);
(Continued)

(58) Field of Classification Search
CPC .. H04N 19/117; H04N 19/122; H04N 19/105; H04N 19/14; H04N 19/159
See application file for complete search history.

(56) References Cited

U.S. PATENT DOCUMENTS 7,266,149 B2 *   9/2007   Holcomb ............. H04N 19/115
                                                 375/240.12
9,661,345 B2 *   5/2017   Lee ........................ H04N 19/82
(Continued)

FOREIGN PATENT DOCUMENTS

JP    2016-220245 A    12/2016
JP      6047616 B2     12/2016
(Continued)

OTHER PUBLICATIONS

International Search Report of PCT/KR2018/000059 dated May 1, 2018.

*Primary Examiner* — Jamie J Atala
*Assistant Examiner* — Michael Robert Cammarata
(74) *Attorney, Agent, or Firm* — Sughrue Mion, PLLC

(57) ABSTRACT

Disclosed is a method for encoding and decoding an image by applying different filtering strength to reference pixels based on a size relationship between a current block and each reference block such that a prediction block for the current block is constructed using reference pixels which are filtered adaptively according to their properties.

5 Claims, 6 Drawing Sheets

(51) Int. Cl.
  *H04N 19/159*   (2014.01)
  *H04N 19/176*   (2014.01)
  *H04N 19/44*    (2014.01)
  *H04N 19/14*    (2014.01)

(52) U.S. Cl.
  CPC ......... *H04N 19/159* (2014.11); *H04N 19/176* (2014.11); *H04N 19/44* (2014.11)

(56) References Cited

U.S. PATENT DOCUMENTS

| | | |
|---|---|---|
| 10,554,969 B2 * | 2/2020 | Lee ............... H04N 19/593 |
| 2012/0093426 A1 | 4/2012 | Sato |
| 2013/0016774 A1 | 1/2013 | Oh |
| 2013/0039421 A1 | 2/2013 | Lee et al. |
| 2014/0119443 A1 | 5/2014 | Park |
| 2015/0023405 A1 * | 1/2015 | Joshi ............... H04N 19/593 |
| | | 375/240.02 |
| 2015/0055699 A1 * | 2/2015 | Min ............... H04N 19/11 |
| | | 375/240.02 |
| 2017/0208343 A1 * | 7/2017 | Jeon ............... H04N 19/82 |
| 2018/0255295 A1 * | 9/2018 | Lee ............... H04N 19/593 |
| 2019/0191155 A1 * | 6/2019 | Ko ............... H04N 19/11 |
| 2019/0246107 A1 | 8/2019 | Leleannec ............ H04N 19/136 |
| 2020/0092550 A1 * | 3/2020 | Piao ............... H04N 19/80 |

FOREIGN PATENT DOCUMENTS

| | | |
|---|---|---|
| KR | 10-2014-0100863 A | 8/2014 |
| KR | 10-1666862 B1 | 10/2016 |
| KR | 10-2016-0142409 A | 12/2016 |

\* cited by examiner

METHOD AND APPARATUS FOR PERFORMING ADAPTIVE FILTERING ON REFERENCE PIXELS BASED ON SIZE RELATIONSHIP OF CURRENT BLOCK AND REFERENCE BLOCK

TECHNICAL FIELD

The present invention relates to an intra-prediction method and apparatus for performing adaptive filtering on a reference pixel, and more particularly, to a technology for improving intra-prediction efficiency by adaptively filtering a reference pixel belonging to a block neighboring to a current block with consideration of characteristics of the neighboring block.

BACKGROUND ART

ISO/ISE Moving Picture Experts Group (MPEG) and ITU-T Video Coding Experts Group (VCEG) organized Joint Collaborative Team on Video Coding (JCV-VC) and established MPEG-H High Efficiency Video Coding (HEVC)/ITU-T H.265, which is a video compression standard technology, in January 2013. Also, in order to respond to the trend of popularizing high-quality images due to the recent rapid development of information communication technology, ISO/ISE MPEG and ITU-T VCEG organized the Joint Video Exploration Team (JVET) at the 22nd JCT-VC Geneva Conference and is actively striving to establish the next generation image compression technology standard for Ultra High Definition (UHD) images, which have a higher image resolution than High Definition (HD) images.

Meanwhile, according to a conventional video compression standard technology, a prediction block for a current block to be encoded is generated, and a difference between the prediction block and the current block is encoded, thereby reducing the amount of data to be encoded. Such a prediction technique includes an intra-prediction method for generating a prediction block for a current block using similarity with a spatially adjacent block in the same screen and an inter-prediction method for generating a prediction block for a current block using similarity with a block in a temporarily adjacent screen.

In the case of the intra-prediction method, the prediction block is generated using a reference pixel included in a neighboring block, and the reference pixel is a pixel reconfigured through quantization and thus contains a quantization error. Therefore, the filtering of the reference pixel is required. However, the conventional technique filters the reference pixel without considering the characteristics of the neighboring block, so that the accuracy of prediction using the filtered reference pixel may be degraded.

DISCLOSURE

Technical Problem

The present invention is directed to providing an intra-prediction method for adaptively filtering a reference pixel.

The present invention is also directed to providing an image decoding apparatus for performing intra-prediction.

Technical Solution

According to an aspect of the present invention, there is provided an intra-prediction method for adaptively filtering a reference pixel.

The intra-prediction method may comprise configuring reference pixels belonging to a neighboring block adjacent to a current block; adaptively filtering the configured reference pixels; and generating a prediction block for the current block by performing intra-prediction using the filtered reference pixels.

The adaptive filtering may comprise performing adaptive filtering according to a relative size of the neighboring block with respect to the size of the current block.

The adaptive filtering may comprise applying a filter weaker than a reference filter to filter the reference pixels when the neighboring block is smaller than the current block.

The adaptive filtering may comprise applying a filter stronger than a reference filter to filter the reference pixels when the neighboring block is larger than the current block.

The adaptive filtering may comprise applying a predetermined reference filter to filter the reference pixels when the neighboring block is equal in size to the current block.

The adaptive filtering may comprise performing the adaptively filtering according to the relative size of the neighboring block when the current block is smaller than a predetermined size.

The adaptive filtering may comprise applying a filter stronger than a reference filter to filter the reference pixels without needing to consider the relative size of the neighboring block when the current block is larger than or equal in size to a predetermined size.

The predetermined size may be one of 64×64, 32×32, 16×16, and 8×8.

The adaptive filtering may be performed only when the minimum distance between an intra-prediction mode of the current block and a vertical mode or a horizontal mode is greater than or equal to a predetermined threshold value.

The adaptive filtering may comprise changing coefficients or the number of taps of a reference filter and then filtering the reference pixels when the neighboring block is smaller than the current block and the configured reference pixels are located on a boundary between two neighboring blocks.

The adaptive filtering may comprise determining whether an edge is present between the reference pixels belonging to the neighboring block when the neighboring block is larger than or equal in size to the current block.

The determining of whether an edge is present may comprise determining whether the edge is present depending on whether a first value obtained by using three consecutive pixels or two consecutive pixels among the reference pixels is greater than a threshold value.

The adaptive filtering may comprise filtering only reference pixels belonging to a neighboring block with no edge.

According to another aspect of the present invention, there is provided an image decoding apparatus for performing intra-prediction.

The image decoding apparatus may comprise at least one processor; and a memory configured to store instructions for instructing the at least one processor to perform at least one step.

The at least one step may comprise configuring reference pixels belonging to a neighboring block adjacent to a current block; adaptively filtering the configured reference pixels; and generating a prediction block for the current block by performing intra-prediction using the filtered reference pixels.

The adaptive filtering may comprise performing adaptive filtering according to a relative size of the neighboring block with respect to the size of the current block.

The adaptive filtering may comprise applying a filter weaker than a reference filter to filter the reference pixels when the neighboring block is smaller than the current block.

The adaptive filtering may comprise applying a filter stronger than a reference filter to filter the reference pixels when the neighboring block is larger than the current block.

The adaptive filtering may comprise applying a predetermined reference filter to filer the reference pixels when the neighboring block is equal in size to the current block.

The adaptive filtering may comprise performing the adaptively filtering according to a relative size of the neighboring block when the current block is smaller than a predetermined size.

The adaptive filtering may comprise applying a filter stronger than a reference filter to filter the reference pixels without needing to consider the relative size of the neighboring block when the current block is larger than or equal in size to a predetermined size.

The predetermined size may be one of 64×64, 32×32, 16×16, and 8×8.

The adaptive filtering may be performed only when the minimum distance between an intra-prediction mode of the current block and a vertical mode or a horizontal mode is greater than or equal to a predetermined threshold value.

Advantageous Effects

With the intra-prediction method and apparatus for adaptively filtering a reference pixel according to the present invention, the characteristics of a neighboring block are reflected when the reference pixel is filtered. Thus, it is possible to enhance the accuracy of a prediction block generated using the filtered reference pixel.

Also, the edge characteristic and the block boundary characteristics of the neighboring block may all be considered, and thus it is possible to improve image encoding and decoding efficiency.

MODES OF THE INVENTION

Figure 1:
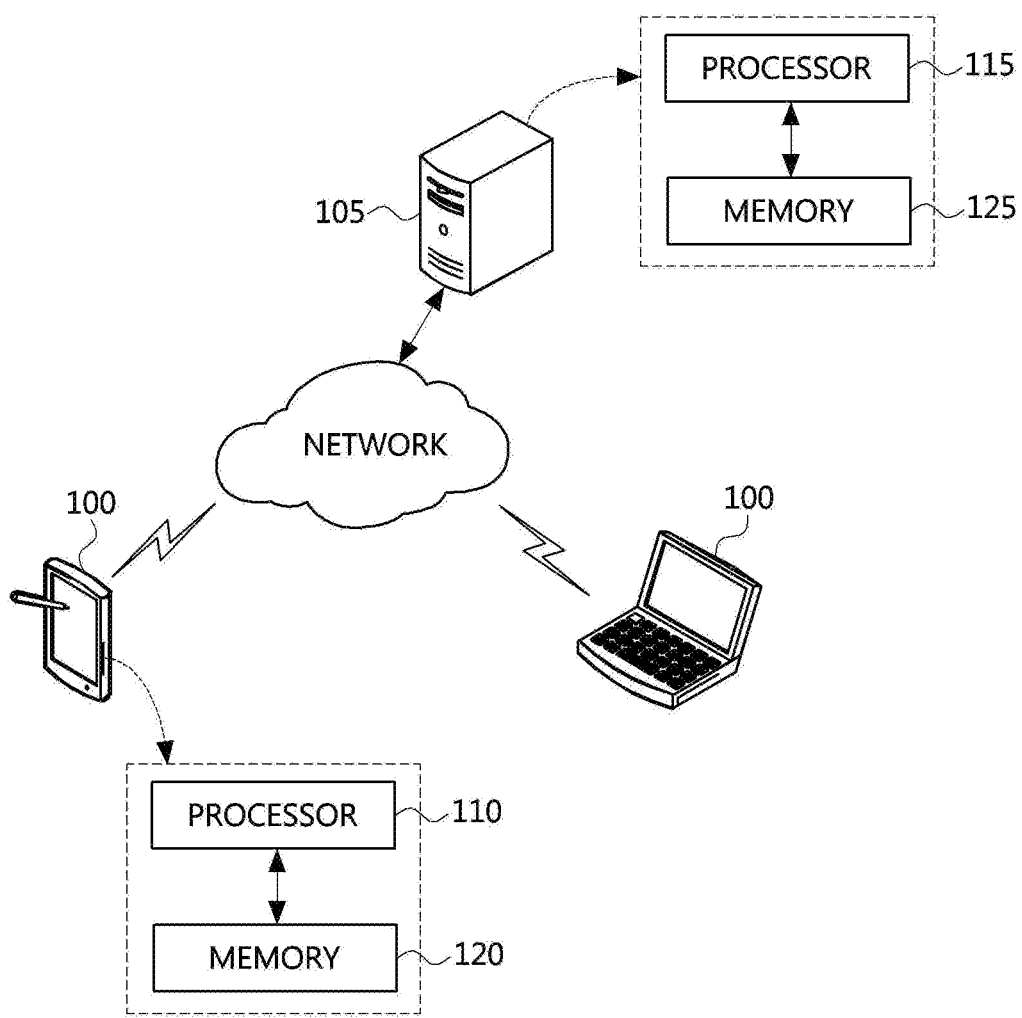
FIG. 1 is a conceptual view of an image encoding and decoding system according to an embodiment of the present invention.

Example embodiments of the present invention are disclosed herein. However, specific structural and functional details disclosed herein are merely representative for purposes of describing example embodiments of the present invention, and example embodiments of the present invention may be embodied in many alternative forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Generally, an image may be composed of a series of still images. The still images may be classified in units of a group of pictures (GOP), and each still image may be referred to as a picture. In this case, the picture may indicate one of frames and fields in a progressive signal and an interlaced signal. The picture may be represented as "frame" when encoding/decoding is performed in units of frames and may be represented as "field" when encoding/decoding is performed in units of fields. The present invention assumes a progressive signal, but may also be applied to an interlaced signal. As a higher concept, units such as a GOP and a sequence may exist, and also each picture may be segmented into predetermined regions such as slices, tiles, blocks, and the like. Also, one GOP may include units such as Picture I, Picture P, and Picture B. Picture I may refer to a picture that is autonomously encoded/decoded without using a reference picture, and Picture P and Picture B may refer to a picture that is encoded/decoded by performing a process such as motion estimation and motion compensation using a reference picture. Generally, Picture P may use Picture I and Picture B as reference pictures, and Picture B may use Picture I and Picture P as reference pictures. However, the above definitions may also be changed by settings of encoding/decoding.

Here, a picture referred to in encoding/decoding is called a reference picture, and a block or pixel referred to in encoding/decoding is called a reference block or a reference pixel. Also, reference data may include frequency-domain coefficients and various types of encoding/decoding information generated and determined during an encoding/decoding process, as well as spatial-domain pixel values. For example, the reference data may correspond to intra-prediction-related information or motion-related information in a prediction unit, transformation-related information in a transformation unit/an inverse transformation unit, quantization-related information in a quantization unit/an inverse quantization unit, encoding/decoding-related information (context information) in an encoding unit/a decoding unit, filter-related information in an in-loop filter unit, and the like.

The minimum unit of the image may be a pixel, and the number of bits used to represent one pixel is called a bit depth. Generally, the bit depth may be eight bits, and a bit depth of more than eight bits may be supported depending on encoding settings. At least one bit depth may be supported depending on a color space. Also, at least one color space may be included according to an image color format. One or more pictures having a predetermined size or one or more pictures having different sizes may be included according to a color format. For example, YCbCr 4:2:0 may be composed of one luminance component (Y in this example) and two chrominance components (Cb/Cr in this example). At this time, the composition ratio of the chrominance components and the luminance component may be 1:2 in width and height. As another example, YCbCr 4:4:4 may have the same composition ratio in width and height. Like the above example, when one or more color spaces are included, a picture may be segmented into the color spaces.

The present invention will be described on the basis of any color space (Y in this example) of any color format (YCbCr in this example), and this description will be applied to another color space (Cb and Cr in this example) of the color format in the same or a similar manner (settings dependent on a specific color space). However, a partial difference (settings independent of a specific color space) may be given to each color space. That is, the settings dependent on each color space may refer to settings proportional to or dependent on the composition ratio of each component (e.g., which is determined depending on 4:2:0, 4:2:2, or 4:4:4), and the settings independent of each color space may refer to settings of only a corresponding color space, independently from or regardless of the composition ratio of each component. In the present invention, some elements may have independent settings or dependent settings depending on the encoder/decoder.

Setting information or syntax elements needed during an image encoding process may be determined at a level of units such as a video, a sequence, a picture, a slice, a tile, a block, and the like. An encoder may add the setting information or syntax elements to a bitstream in units of a video parameter set (VPS), a sequence parameter set (SPS), a picture parameter set (PPS), a slice header, a tile header, a block header, or the like and transmit the bitstream to a decoder. The decoder may parse the bitstream at the same level, restore the setting information transmitted from the encoder, and use the setting information in an image decoding process. Also, related information may be transmitted through a bitstream in the form of supplement enhancement information (SEI) or metadata and then may be parsed and used. Each parameter set has a unique ID value, and a lower parameter set may have an ID value of an upper parameter set to be referred to. For example, a lower parameter set may refer to information of an upper parameter set having a matching ID value among one or more upper parameter sets. Among various examples of the above-described units, when any one unit includes one or more different units, the any one unit may be referred to as an upper unit, and the included units may be referred to as lower units.

Setting information having occurred in such a unit may include settings independent for each unit or settings dependent on a previous, following, or upper unit. Here, the dependent settings may be understood as indicating setting information of a corresponding unit using flag information corresponding to settings of the previous, following, or upper unit (e.g., 1-bit flag; 1 indicates Follow, and 0 indicates Do Not Follow). In the present invention, the setting information will be described focusing on an example of the independent settings. However, an example may also be included in which a relationship dependent on the setting information of the previous, following, or upper unit of the current unit is added to, or substituted for, the independent settings.

Preferred embodiments of the present invention will be described below in more detail with reference to the accompanying drawings.

FIG. 1 is a conceptual view of an image encoding and decoding system according to an embodiment of the present invention.

Referring to FIG. 1, an image encoding apparatus 105 and an image decoding apparatus 100 may be a user terminal such as a personal computer (PC), a notebook computer, a personal digital assistant (PDA), a portable multimedia player (PMP), a PlayStation Portable (PSP), a wireless communication terminal, a smartphone, and a TV or a server terminal such as an application server and a service server and may include a variety of apparatuses having a communication device, such as a communication modem, for communicating with various devices or wired/wireless communication networks, a memory 120 or 125 for storing various programs and data for performing inter- or intra-prediction to encode or decode an image, a processor 110 or 115 for executing programs to perform computation and control, and so on. Also, an image encoded into a bitstream by the image encoding apparatus 105 is transmitted to the image decoding apparatus 100 in real time or in non-real time through a wired/wireless communication network such as the Internet, a local area network (LAN), a wireless LAN, a WiBro network, or a mobile communication network or through a variety of communication interfaces such as a cable, a universal serial bus (USB), or the like. The bitstream may be decoded by the image decoding apparatus 100 to restore the image, and the image may be reproduced. Also, the image encoded into the bitstream by the image encoding apparatus 105 may be transferred from the image encoding apparatus 105 to the image decoding apparatus 100 through a computer-readable recording medium.

Figure 2:
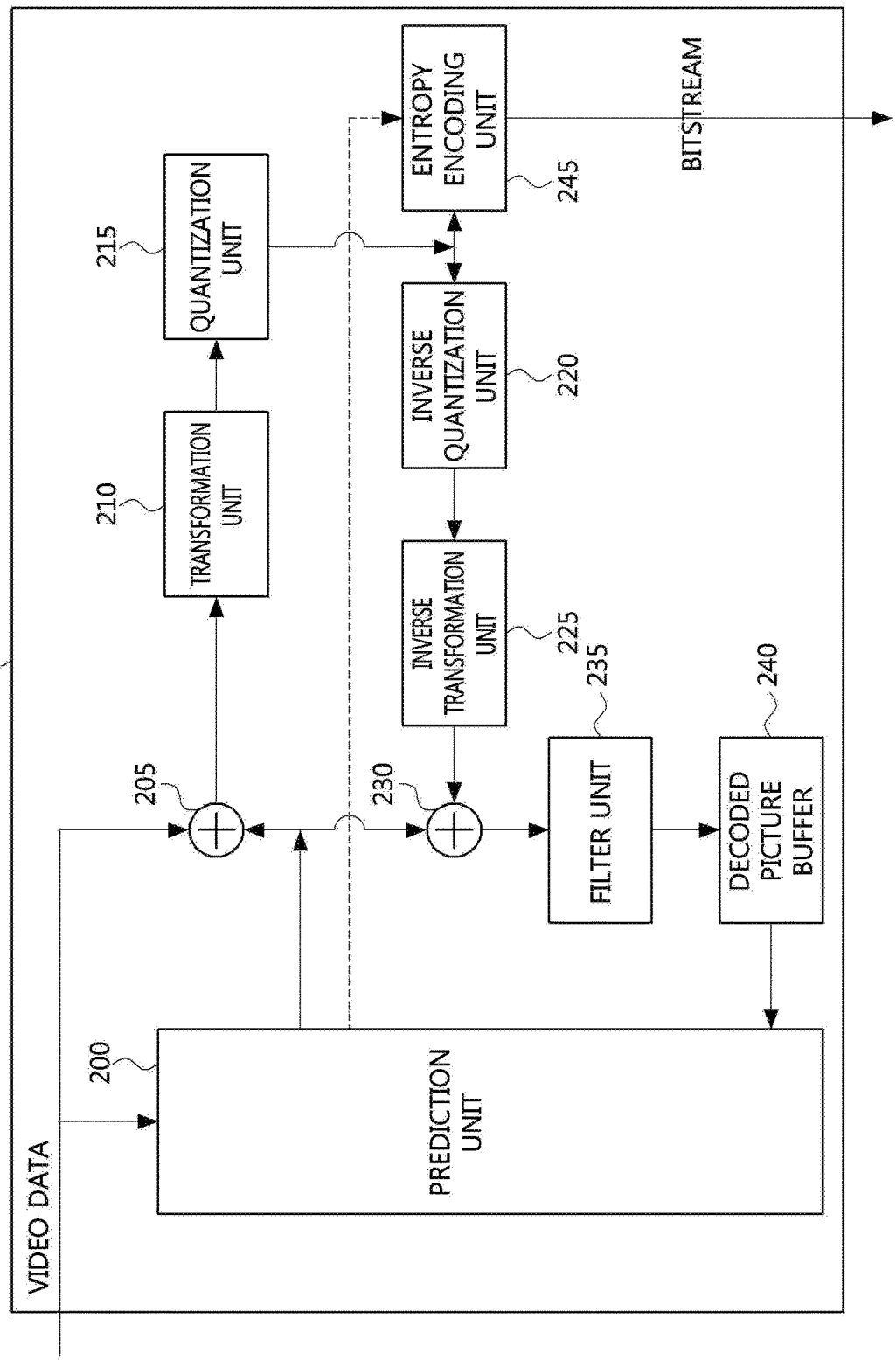
FIG. 2 is a block diagram of an image encoding apparatus according to an embodiment of the present invention.

FIG. 2 is a block diagram of an image encoding apparatus according to an embodiment of the present invention.

As shown in FIG. 2, an image encoding apparatus 20 according to the embodiment may include a prediction unit 200, a subtractor unit 205, a transformation unit 210, a quantization unit 215, an inverse quantization unit 220, an inverse transformation unit 225, an adder unit 230, a filter unit 235, a decoded picture buffer 240, and an entropy encoding unit 245.

The prediction unit 200 may include an intra-prediction unit configured to perform intra-prediction and an inter-prediction unit configured to perform inter-prediction. The intra-prediction may generate a prediction block by performing spatial prediction using a pixel of a block adjacent to a current block, and the inter-prediction may generate a prediction block by finding a region that best matches a current block on the basis of a reference image and performing motion compensation. Whether to use the intra-prediction or the inter-prediction may be determined for a corresponding unit (an encoding unit or a prediction unit), detailed information (e.g., an intra-prediction mode, a motion vector, a reference image, etc.) on each prediction method may be determined. In this case, a processing unit for performing prediction, a prediction method, and a processing unit for determining details may be determined according to encoding/decoding settings. For example, a prediction method, a prediction mode, and the like may be determined in prediction units, and prediction may be performed in transformation units.

The subtractor unit 205 may subtract the prediction block from the current block to generate a residual block. That is, the subtractor unit 205 may calculate a difference between a pixel value of each pixel of the current block to be encoded and a predicted pixel value of a corresponding pixel of the prediction block generated through the prediction unit to generate a residual block, which is a block-type residual signal.

The transformation unit 210 transforms the residual block into a frequency domain to transform each pixel value of the residual block into a frequency coefficient. Here, the transformation unit 210 may transform a residual signal into the frequency domain by using various transformation techniques for transforming a picture signal on the spatial axis into the frequency axis, such as Hadamard transform, discrete cosine transform (DCT)-based transform, discrete sine transform (DST)-based transform, and Karhuhen-Loeve transform (KTL)-based transform. The residual signal transformed into the frequency domain is a frequency coefficient. The transformation may be made by a one-dimensional transformation matrix. Each transformation matrix may be adaptively used in horizontal and vertical units. For example, for the intra-prediction, when the prediction mode is horizontal, the DCT-based transformation matrix may be used in a vertical direction, and the DST-based transformation matrix may be used in a horizontal direction. When the prediction mode is vertical, the DCT-based transformation matrix may be used in a horizontal direction, and the DST-based transformation matrix may be used in a vertical direction.

The quantization unit 215 quantizes the residual block having the frequency coefficient obtained through the transformation into the frequency domain by the transformation unit 210. Here, the quantization unit 215 may quantize the transformed residual block by using a dead zone uniform threshold quantization, a quantization weighted matrix, or other enhanced quantization methods. One or more quantization methods may be provided as candidates and may be determined by an encoding mode, prediction mode information, and the like.

The entropy encoding unit 245 scans a generated quantization frequency coefficient string according to various scan schemes to generate a quantization coefficient string, encodes the generated quantization coefficient string using an entropy encoding technique or the like, and outputs the encoded string. One of various patterns such as a zigzag pattern, a diagonal pattern, and a raster pattern may be set as a pattern for the scanning.

The inverse quantization unit 220 inversely quantizes the residual block quantized by the quantization unit 215. That is, the inverse quantization unit 220 inversely quantizes the quantization frequency coefficient string to generate a residual block having a frequency coefficient.

The inverse transformation unit 225 inversely transforms the residual block that is inversely quantized by the inverse quantization unit 220. That is, the inverse transformation unit 225 inversely transforms the frequency coefficients of the inversely quantized residual block to generate a residual block having a pixel value, i.e., a restored residual block. Here, the inverse transformation unit 225 may perform inverse transformation by inversely using the transformation scheme used by the transformation unit 210.

The adder unit 230 adds the residual block restored by the inverse transformation unit 225 to the prediction block predicted by the prediction unit 200 to restore the current block. The restored current block may be stored in the decoded picture buffer 240 as a reference picture (or a reference block) and may be used as the reference picture when a block after the current block or another block or picture subsequent to the current block is encoded.

The filter unit 235 may perform a post-processing filtering process of one or more of a deblocking filter, a sample adaptive offset (SAO), an adaptive loop filter (ALF), and the like. The deblocking filter may remove block distortion generated at a boundary between blocks from the restored picture. The ALF may perform filtering on the basis of a value obtained by comparing an original image to an image restored after the block is filtered through the deblocking filter. The SAO may restore an offset difference between the original image and the residual block to which the deblocking filter is applied, in units of pixels and may be applied in the formed of a band offset, an edge offset, or the like. Such a post-processing filter may be applied to the restored picture or block.

The decoded picture buffer 240 may store the block or picture restored through the filter unit 235. The restored block or picture stored in the decoded picture buffer 240 may be provided to the prediction unit 200, which is configured to perform intra-prediction or inter-prediction.

Although not shown, a segmentation unit may be additionally included, and the restored block or picture may be segmented into encoding units having various sizes by the segmentation unit. In this case, such an encoding unit may be composed of a plurality of encoding blocks (e.g., one luminance encoding block, two chrominance encoding blocks, etc.) according to a color format. For convenience of description, one color component unit is assumed. The encoding block may have a variable size such as M×M (e.g., M is 4, 8, 16, 32, 64, 128, or the like). Alternatively, depending on segmentation schemes (e.g., tree-based segmentation, quadtree segmentation, binary tree segmentation, etc.), the encoding block may have a variable size of M×N (e.g., M and N are 4, 8, 16, 32, 64, 128, or the like). In this case, the encoding block may be a unit that is a basis for intra-prediction, inter-prediction, transformation, quantization, entropy encoding, and the like.

The present invention assumes that a plurality of sub-blocks having the same size and shape are acquired depending on the segmentation schemes. However, the present invention may also be applied to asymmetric sub-blocks (e.g., for a binary tree, 4M×4N is segmented into 3M×4N and M×4N or 4M×3N and 4M×N). In this case, the asymmetric sub-blocks may be supported by information used to determine whether the segmentation scheme for acquiring the symmetric sub-blocks will provide additional support according to the encoding/decoding settings.

The segmentation of the encoding block (with a size of M×N) may have a recursive tree-based structure. In this case, whether to perform segmentation may be represented through a segmentation flag (e.g., a quadtree segmentation flag, a binary segmentation flag, etc.). For example, when the segmentation flag of an encoding block having a segmentation depth of k indicates 0, the encoding of the encoding block may be performed on the encoding block having a segmentation depth of k. When the segmentation flag of the encoding block having a segmentation depth of k is 1, the encoding of the encoding block may be performed on four sub-encoding blocks (for quadtree segmentation) or two sub-encoding blocks (for binary tree segmentation), each of which has a segmentation depth of k+1, depending on the segmentation schemes. In this case, the size of the block may be (M>>1)×(N>>1) in the case of the four encoding blocks and may be (M>>1)×N or M×(N>>1) in the case of the two encoding blocks. Each of the sub-encoding blocks may be reset as an encoding block (k+1) and may be segmented into sub-encoding blocks (k+2) through the above process. In this case, one segmentation flag (e.g., a segmentation presence flag) may be supported in the case of the quadtree segmentation, and at least one (up to two) flag (e.g., a segmentation direction flag <horizontal or vertical; which may be omitted in some cases depending on a preceding upper or previous segmentation result> in addition to the segmentation presence flag) may be supported in the case of the binary tree segmentation.

The block segmentation may be performed, starting from the maximum encoding block up to the minimum encoding block. Alternatively, the block segmentation may be performed, starting from the minimum segmentation depth up to the maximum segmentation depth. That is, the segmentation may be recursively performed until the block size reaches the minimum encoding block size or until the segmentation depth reaches the maximum segmentation depth. In this case, the maximum encoding block size, the minimum encoding block size, and the maximum segmentation depth may be adaptively set depending on the encoding/decoding settings (e.g., image <slice, tile>, type <I/P/B>, encoding mode <intra-inter>, chrominance component <Y/Cb/Cr>, etc.). For example, when the maximum encoding block has a size of 128×128, the quadtree segmentation may be performed in the range of 8×8 to 128×128, and the binary tree segmentation may be performed in the range of 4×4 to 32×32 and in the case where the maximum segmentation depth is 3. Alternatively, the quadtree segmentation may be performed in the range of 8×8 to 128×128, and the binary tree segmentation may be performed in the range of 4×4 to 128×128 and in the case where the maximum segmentation depth is 3. The former case may indicate settings for image type I (e.g., a slice), and the latter case may indicate settings for image type P or B. As described in the above example, the segmentation settings such as the maximum encoding block size, the minimum encoding block size, and the maximum segmentation depth may be supported individually or in common depending on the segmentation schemes.

When a plurality of segmentation schemes are supported, the segmentation may be performed in a block support range of each of the segmentation schemes. When the block support ranges of the segmentation schemes overlap each other, the segmentation schemes may have their own priorities. For example, the quadtree segmentation may precede the binary tree segmentation. Also, when a plurality of segmentation schemes are supported, whether to perform the following segmentation may be determined depending on a result of the preceding segmentation. For example, when the result of the preceding segmentation indicates to perform segmentation, sub-encoding blocks obtained through the preceding segmentation may be reset to be encoding blocks and then segmented, instead of the following segmentation being performed.

Alternatively, when the result of the preceding segmentation indicates not to perform segmentation, the segmentation may be performed according to the result of the following segmentation. In this case, when the result of the following segmentation indicates to perform segmentation, sub-encoding blocks obtained through the following segmentation may be reset to encoding blocks and then segmented. When the result of the following segmentation indicates not to perform segmentation, the segmentation is no longer performed. In this case, even though the result of the following segmentation indicates to perform segmentation and the sub-encoding blocks obtained through the following segmentation are reset to encoding blocks, the preceding segmentation may not be performed and only the following segmentation may be supported when the plurality of segmentation schemes are supported. That is, when the plurality of segmentation schemes are supported and the result of the preceding segmentation indicates not to perform segmentation, the segmentation is no longer performed.

For example, when an encoding block having a size of M×N is capable of quadtree segmentation and binary tree segmentation, a quadtree segmentation flag may be checked first. When the segmentation flag is 1, the encoding block may be segmented into four sub-encoding blocks having a size of (M>>1)×(N>>1). Then, each of the sub-encoding blocks may be reset to an encoding block, and segmentation (quadtree segmentation or binary tree segmentation) may be performed on the encoding block. When the segmentation flag is 0, a binary tree segmentation flag may be checked. When the binary tree segmentation flag is 1, the encoding block may be segmented into two sub-encoding blocks having a size of (M>>1)×N or M×(N>>1). Then, each of the sub-encoding blocks may be reset to an encoding block, and segmentation (binary tree segmentation) may be performed on the encoding block. When the segmentation flag is 0, the segmentation process is terminated, and encoding proceeds.

Although a case where a plurality of segmentation schemes are performed has been described as an example, the present invention is not limited thereto, and a combination of supporting various segmentation schemes may be possible. For example, a segmentation scheme such as a quadtree, a binary tree, and a quadtree+a binary tree may be used. In this case, the quadtree scheme may be set as a default segmentation scheme, and the binary tree scheme may be set as an additional segmentation scheme. Information about whether to support the additional segmentation scheme may be explicitly included in units of a sequence, a picture, a slice, a tile, or the like.

In the above example, information associated with segmentation, such as size information of encoding blocks, the range of supporting encoding blocks, and the maximum segmentation depth may be included in units of a sequence, a picture, a slice, a tile, or the like or may be implicitly determined. In summary, the range of allowable blocks may be determined by the maximum encoding block size, the range of supported blocks, the maximum segmentation depth, and the like.

The encoding block acquired by the segmentation being performed through the process may be set to have the maximum size for the intra-prediction or the inter-prediction. That is, the encoding block obtained after the block segmentation may have an initial size for segmentation of the prediction block for intra-prediction or inter-prediction. For example, when the encoding block has a size of 2M×2N, the prediction block may have a size smaller than or equal to that of the encoding block, i.e., a size of 2M×2N or M×N. Alternatively, the prediction block may have a size of 2M×2N, 2M×N. M×2N, or M×N. Alternatively, the prediction block may have the same size as the encoding block, i.e., a size of 2M×2N. In this case, the encoding block and the prediction block having the same size may mean that the prediction block is not segmented and prediction is performed with a size acquired through segmentation of the encoding block. That is, this means that segmentation information for the prediction block is not generated. The settings may be applied even to a transformation block, and transformation may be performed in units of segmented encoding blocks. That is, a square or rectangular block acquired through the segmentation result may be a block used for intra-prediction and inter-prediction and also may be a block used for transformation and quantization of a residual component.

Figure 3:
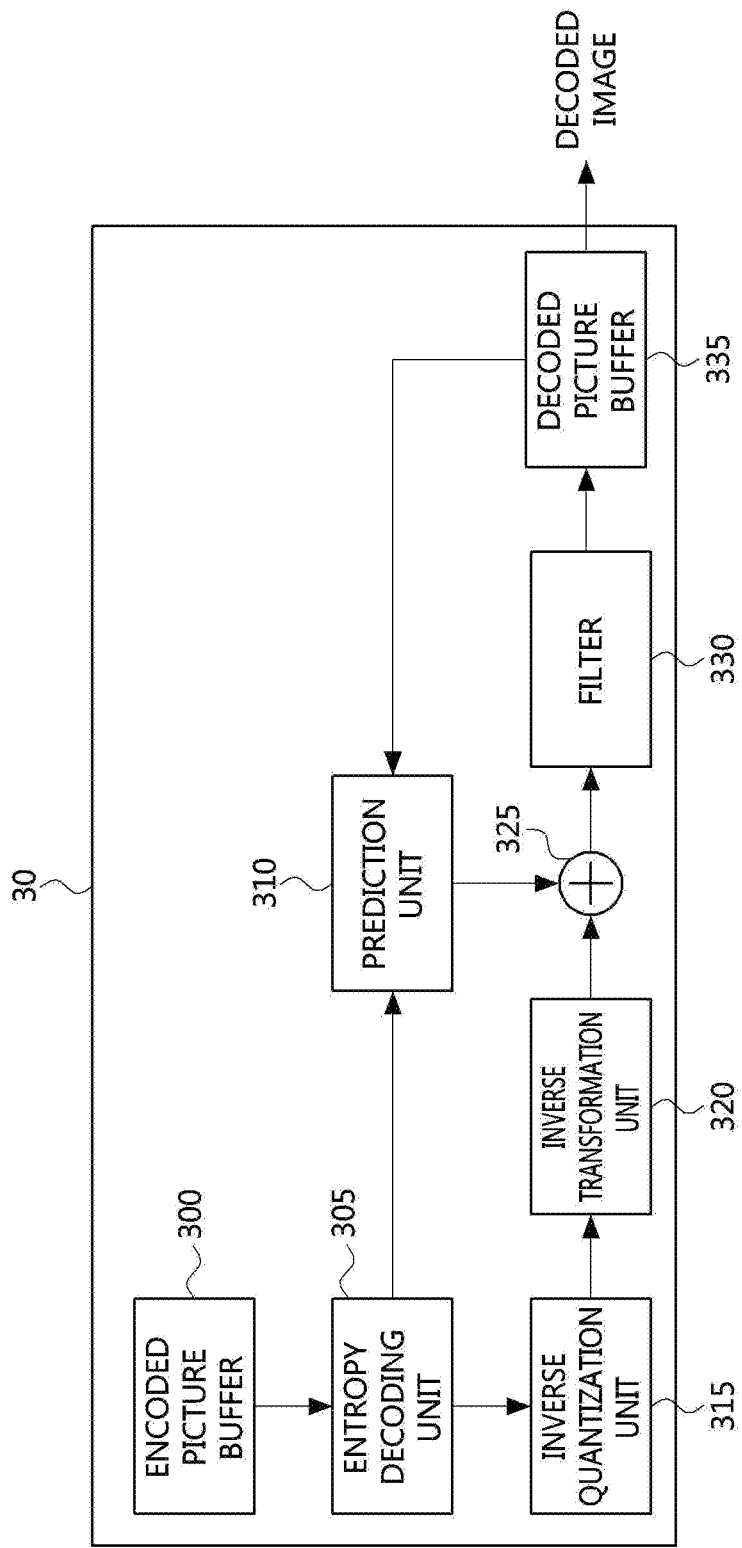
FIG. 3 is a block diagram of an image decoding apparatus according to an embodiment of the present invention.

FIG. 3 is a block diagram of an image decoding apparatus according to an embodiment of the present invention.

Referring to FIG. 3, an image decoding apparatus 30 may include an encoded picture buffer 300, an entropy decoding unit 305, a prediction unit 310, an inverse quantization unit 315, an inverse transformation unit 320, an adder-subtractor 325, a filter 330, and a decoded picture buffer 335.

Also, the prediction unit 310 may include an intra-prediction module and an inter-prediction module.

First, when an image bitstream is received from the image encoding apparatus 20, the received bitstream may be stored in the encoded picture buffer 300.

The entropy decoding unit 305 may decode the bitstream to generate quantized coefficients, motion vectors, and other syntaxes. The generated data may be transferred to the prediction unit 310.

The prediction unit 310 may generate a prediction block on the basis of the data transferred from the entropy decoding unit 305. In this case, a reference picture list may be configured using a default configuration technique on the basis of a reference image stored in the decoded picture buffer 335.

The inverse quantization unit 315 may inversely quantize quantized transformation coefficients that are provided in the bitstream and decoded by the entropy decoding unit 305.

The inverse transformation unit 320 may apply inverse DCT, inverse integer transformation, or inverse-transformation techniques with similar concepts to the transformation coefficients to generate a residual block.

In this case, the inverse quantization unit 315 and the inverse transformation unit 320 may be implemented in various methods to inversely perform the processes performed by the transformation unit 210 and the quantization unit 215 of the image encoding apparatus 20, which have been described above, respectively. For example, the inverse quantization unit 315 and the inverse transformation unit 320 may use the same process and inverse transformation shared with the transformation unit 210 and the quantization unit 215 and may inversely perform the transformation and quantization process using information regarding the transformation and quantization process (e.g., a transformation size, a transformation form, a quantization type, etc.) which is received from the image encoding apparatus 20.

A restored image block may be generated by adding the residual block on which the inverse quantization and inverse transformation process is performed to the prediction block obtained by the prediction unit 310. The addition may be achieved by the adder-subtractor 325.

A deblocking filter may be applied to the restored image block as the filter 330 in order to remove a blocking phenomenon if necessary, and other loop filters may be additionally used before and after the decoding process in order to enhance video quality.

The image block on which the restoration and filtering are performed may be stored in the decoded picture buffer 335.

Figure 4:
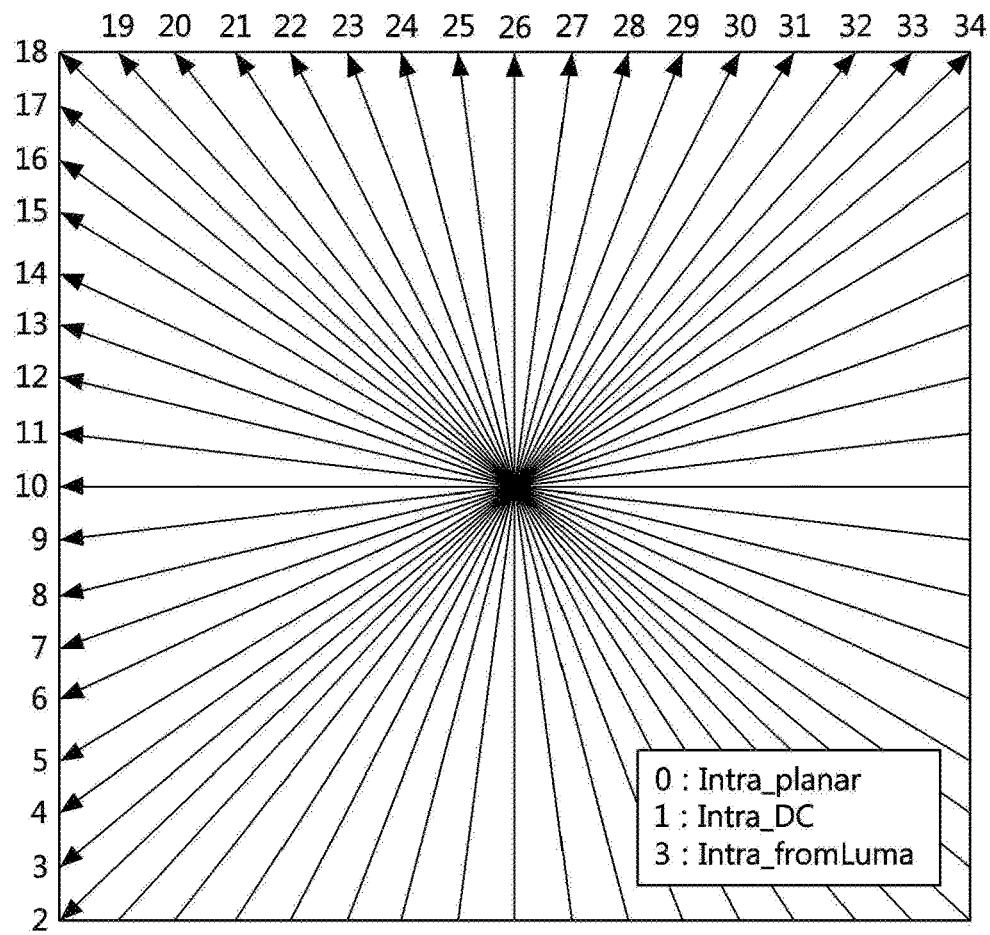
FIG. 4 is an example diagram illustrating an intra-prediction mode in High Efficiency Video Coding (HEVC).

FIG. 4 is an example diagram illustrating an intra-prediction mode in High Efficiency Video Coding (HEVC).

Referring to FIG. 4, several orientations forming an intra-prediction mode may be checked in the HEVC.

In detail, the HEVC may support a total of 35 intra-prediction modes, including 33 directional modes (shown in directions #2 to #34) and two non-directional modes (Intra_planar, Intra_DC). In this case, different numbers of intra-prediction modes may be set depending on block sizes. For example, a block having a size of 64×64 may support 67 intra-prediction modes, a block having a size of 32×32 may support 35 intra-prediction modes, and a block having a size of 16×16 may support 19 intra-prediction modes.

Figure 5:
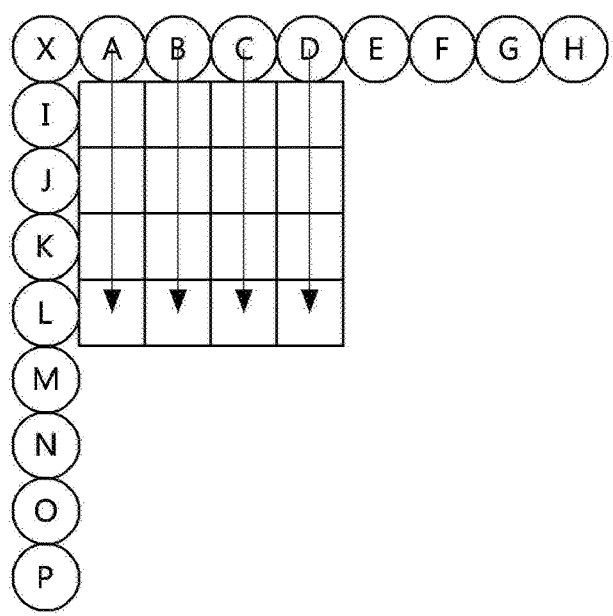
FIG. 5 is an example diagram illustrating an intra-prediction method according to a vertical mode.

FIG. 5 is an example diagram illustrating an intra-prediction method according to a vertical mode.

Referring to FIG. 5, all or some of pixels X, A, B, C, D, . . . , L, M, N, O, and P adjacent to a current block among pixels belonging to a neighboring block adjacent to the current block may be used as reference pixels for intra-prediction. In this case, the neighboring block adjacent to the current block may include blocks on the lower left side, the left side, the upper left side, the upper side, and the upper right side of the current block.

Here, the reference pixels according to the vertical mode may be adjacent pixels A, B, C, and D belonging to a block on the upper side of the current block. Accordingly, a prediction block for the current block may be generated by interpolating, extrapolating, or averaging (e.g., copying reference pixels in a vertical direction) the adjacent pixels belonging to the block on the upper side of the current block.

Even though the vertical mode has been described as an example in FIG. 5, it will be easily understood by those skilled in the art that all of the directional modes and the non-direction modes shown in FIG. 4 can be applied in the same manner.

Meanwhile, the reference pixels used for the intra-prediction are pixels belonging to a neighboring block and may contain a quantization error generated during an encoding-decoding process of the neighboring block. Accordingly, reference pixel filtering may be needed to remove the quantization error.

However, the reference pixel filtering may not always produce good results. For example, when a pixel value greatly different from an original pixel value is obtained as a result of the filtering in addition to the quantization error being reduced through the filtering, the accuracy of the intra-prediction may be reduced due to inaccurate reference pixels. However, when the filtering is not performed, the quantization error cannot be reduced, which may lead to a reduction in the accuracy of the intra-prediction.

To this end, there is a need for a method for adaptive filtering. For example, through analysis of statistical characteristics, the filtering may be implicitly applied according to the size of the current block in the case of Advanced Video Coding (AVC), and the filtering may be implicitly applied according to the size of the current block and the prediction mode of the current block in the case of the HEVC.

The reference pixels may be used to generate the prediction block for the current block but belong to the neighboring block other than the current block. In the case of a conventional method, the filtering is applied with consideration of only the state (the block size or prediction mode) of the current block, and thus image characteristics cannot be properly reflected.

Various methods for effective reference pixel filtering may be supported.

As an example, conventionally, a single filter (e.g., a 3-tap filter [1,2,1]/4) applied for reference pixel filtering (in the implicit case in this example) is supported, but a plurality of filters (e.g., 3-tap filter [1,2,1]/4 a 5-tap filter [2,3,6,3,2]/16, etc.) may be supported. In this case, the filtering process means that filtering is applied to a target pixel to be filtered and at least one pixel adjacent to the target pixel (pixels at upper, lower, right, and left sides of the target pixel). Also, the filtering process means that filtering is applied using pixels that are not adjacent to the target pixel to be filtered (e.g., bi-directional filtering using pixels located at the corners of the block).

For example, filtering is not applied to blocks having a size of less than 8×8, a filter A (3-tap filter in this example) is applied to blocks having a size ranging from 8×8 to 32×32, and a filter B (5-tap filter in this example) is applied to blocks having a size of more than 32×32. In the above example, the filtering-related classification has been performed according to the block size, but the classification may be performed with consideration of the block type, the prediction mode, and the like.

As an example, conventionally, whether to apply the reference pixel filtering is implicitly processed, but filtering-related information may be explicitly generated.

For example, information regarding whether a predetermined filter (e.g., a 3-tap filter [1,2,1]/4) is applied to the reference pixels may be generated. The filtering is applied to the reference pixels when the flag is 1 and is not applied to the reference pixels when the flag is 0.

Alternatively, in addition to the information regarding whether to apply the filtering, one filter candidate group may be selected from among a plurality of filter candidate groups. That is, filter selection information may be explicitly generated in addition to a filtering application flag. For example, a plurality of filters (e.g., a 3-tap filter [1,2,1]/4 and a 5-tap filter [2,3,6,3,2]/16) may be provided as a reference pixel filter candidate group. When a reference pixel filtering application flag is 1, reference pixel filtering corresponding to the filter selection information (e.g., a 3-tap filter when the filter selection information indicates 0 and a 5-tap filter when the filter selection information indicates 1) may be performed. Alternatively, when the reference pixel filtering application flag is 0, the filtering is not applied to the reference pixels.

Also, the reference pixel filtering process may be performed while the information of the current block is associated with the filtering settings.

For example, the filtering may be implicitly processed in some of the encoding/decoding settings and may be explicitly processed in other of the encoding/decoding settings. In detail, when the filtering is implicitly processed and performed in some of the encoding/decoding settings, the filter selection information may be implicitly processed. When the filtering is explicitly processed and performed in other of the encoding/decoding settings, the filter selection information may also be explicitly processed. Alternatively, when the filtering is implicitly processed but performed in some of the encoding/decoding settings, the filtering may be processed according to the filter selection information that is explicitly generated. When the filtering is explicitly processed but performed in other of the encoding/decoding settings, the filtering may be processed according to the filter selection information that is implicitly processed. In this case, the encoding/decoding settings may be determined by at least one of or a combination of the size, shape, prediction mode, and the like of the current block.

For example, the filtering may be explicitly performed and the plurality of filter candidate groups may be supported in the case of blocks having a size of less than 8×8. The filtering may be explicitly performed and one predetermined filter may be supported in the case of blocks having a size ranging from 8×8 to 32×32. The filtering may be implicitly supported in the case of blocks having a size of more than 32×32. In the above example, the filtering-related classification has been performed according to the block size, but the classification may be performed with consideration of the shape, the prediction mode, and the like of the block.

In the above example, various combinations for the reference pixel filtering in which the filtering is adaptively determined according to the characteristics of the current block have been described. However, the present invention is not limited thereto, and various modifications and combinations may be possible. In the following example, an adaptive filtering method for reference pixels with consideration of the characteristics of a neighboring block and a correlation between the current block and the neighboring block as well as the characteristics of the current block will be proposed. The following description will focus on the case of implicitly processing, but may be applied to the explicit or other settings as is or after modification.

Also, in the following example, the adaptive filtering will be described focusing on the block size in the correlation between the current block and the neighboring block, but the example may be understood as the case where the reference pixel filtering used for the current block is applied with consideration of the state (e.g., block segmentation, block boundaries, etc.) of the neighboring block used to predict the current block.

Figure 6:
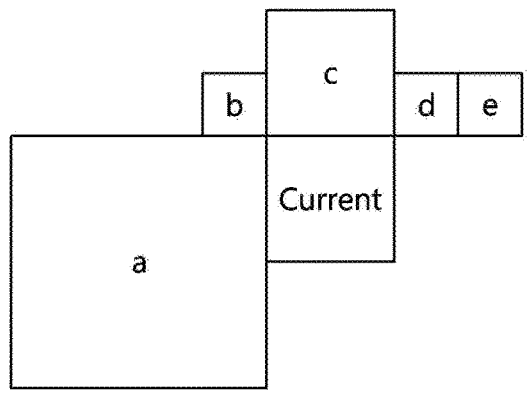
FIG. 6 is an example diagram illustrating a method of adaptively filtering a reference pixel on the basis of a correlation between a current block and a neighboring block in intra-prediction according to an embodiment of the present invention.

FIG. 6 is an example diagram illustrating a method of adaptively filtering a reference pixel on the basis of a correlation between a current block and a neighboring block in intra-prediction according to an embodiment of the present invention.

Referring to FIG. 6, the neighboring block adjacent to the current block (Current) may include a block a located on the left side, a block b located on the upper left side, a block c located on the upper side, and blocks d and e located on the upper right side (hereinafter, each block may be referred to as its reference numeral). In this case, the size of the neighboring blocks adjacent to the current block (Current) (specifically the width or length of the current block, which is referred to as a size because this example is for a square block) may be identical to or different from the current block. For example, the block a may be larger than the current block (Current), the block b may be smaller than the current block, the block c may be equal to the current block, and the blocks d and e may be smaller than the current block.

According to a first embodiment of the present invention, adaptive filtering may be performed on a reference pixel on the basis of the relationship in size between the current block and the neighboring blocks. Different filtering methods may be applied to reference pixels in at least two of the case where a neighboring block is greater than the current block, the case where a neighboring block is equal to the current block, and the case where a neighboring block is smaller than the current block through comparison in size between the current block and the neighboring block.

For example, a first filtering method may be applied to reference pixels belonging to the neighboring blocks b, d, and e smaller than the current block (Current), a second filtering method may be applied to reference pixels belonging to the neighboring block c equal to the current block (Current), and a third filtering method may be applied to reference pixels belonging to the neighboring block a larger than the current block (Current).

Also, the third filtering method may be applied to the reference pixels belonging to all the neighboring blocks when all the neighboring blocks are larger than the current block, the second filtering method may be applied to the reference pixels belonging to all the neighboring blocks when all the neighboring blocks are equal to the current block, and the first filtering method may be applied to the reference pixels belonging to all the neighboring blocks when all the neighboring blocks are smaller than the current block.

The weakest filter (e.g., a 3-tap filter [1,2,1]/4) may be applied for the first filtering method that is applied when a neighboring block is smaller than the current block, the strongest filter (e.g., a bi-directional filter using pixels at the corners) may be applied for the third filtering method that is applied when a neighboring block is larger than the current block, and a filter having a middle level of filtering strength (e.g., a 5-tap filter [2, 3, 6, 3, 2]/16) may be applied for the second filtering method that is applied when a neighboring block is equal to the current block.

Here, when the second filtering method is described as a predetermined reference filtering method, the first filtering method may be described as a filtering method weaker than the second filtering method, and the third filtering method may be described as a filtering method stronger than the second filtering method. In detail, strong filtering may be filtering corresponding to when the number of pixels to be referred to in the filtering process is large or when the interval between pixels is long, and weak filtering may be filtering with properties that are relatively opposite to the above definition. However, the present invention is not limited thereto, and various definitions may be possible. Hereinafter, the first to third filtering methods have the same meanings as described above.

According to a second embodiment of the present invention, adaptive filtering may be performed on a reference pixel on the basis of the relationship in size between the current block and the neighboring blocks and the size of the current block. As described above, the adaptive filtering may be an example filtering that is performed with consideration of the characteristics of the current block, such as the size, shape, prediction mode, and the like of the current block, and the correlation between the current block and the neighboring block (in this example, the size of the current block is additionally considered).

Referring to FIG. 6 again, for example, the current block (Current) is smaller than a predetermined size M×N. and the first filtering method (the weakest filter) may be applied to the reference pixels belonging to the neighboring blocks b, d, and e smaller than the current block (Current). The current block (Current) is smaller than the predetermined size, and the second filtering method may be applied to the reference pixels belonging to the neighboring blocks a and c greater than or equal to the current block (Current). Also, when the current block (Current) is larger than the predetermined size, the third filtering method may be applied regardless of the sizes of the neighboring blocks. That is, unlike the first embodiment, according to the second embodiment, the third filtering method (the strongest filter) may be collectively applied without considering the sizes of the neighboring blocks when the current block is larger than the predetermined size. In this case, the predetermined size may be one of 64×64, 32×32, 16×16, and 8×8.

According to a third embodiment of the present invention, the prediction mode of the current block may be considered as an assumption for performing adaptive filtering on a reference pixel on the basis of the relationship in size between the current block and the neighboring blocks according to the first embodiment. This example may be an example filtering that is performed with consideration of the characteristics of the current block and the correlation between the current block and the neighboring block (in this example, the prediction mode of the current block is additionally considered).

That is, the adaptive filtering according to the first embodiment may be performed only when the intra-prediction mode of the current block satisfies a predetermined condition and may be omitted when the intra-prediction mode does not satisfy the predetermined condition. Here, the minimum distance (minDistVerHor) between the intra-prediction mode of the current block and the vertical mode or the horizontal mode may be considered as the predetermined condition, and the minimum distance may be defined as in Equation 1.

$$\text{minDistVerHor} = \min(\text{abs}(\text{predmode}-26), \text{abs}(\text{predmode}-10)) \quad \text{[Equation 1]}$$

Referring to Equation 1, predmode may be a number indicating the intra-prediction mode of the current block (referring to an intra-prediction mode number shown in FIG. 4), abs may be an operation for obtaining an absolute value, min may be an operation for obtaining a minimum value of the two values, 26 may be a mode number of the vertical mode, and 10 may be a mode number of the horizontal mode. That is, the minimum distance may be a value that minimizes a difference between the intra-prediction mode number of the current block and the horizontal mode number or the vertical mode number.

Therefore, according to the third embodiment, the adaptive filtering according to the first embodiment may be performed only when the minimum distance between the intra-prediction mode of the current block and the vertical mode or the horizontal mode is greater than or equal to a predetermined threshold value. Also, when the minimum distance between the intra-prediction mode of the current block and the vertical mode or the horizontal mode is smaller than the predetermined threshold value, the filtering of the reference pixels belonging to the neighboring blocks may be omitted. The threshold value may have one common value or may have a value determined according to the size, shape, etc. of the block.

The reference pixel filtering through comparison in size between the current block and the neighboring block has been described with reference to the above example. Although filtering classification through a simple comparison of block sizes has been described through several embodiments, this can be understood as an example filtering that considers characteristics of neighboring blocks.

Generally, a block boundary region contains many quantization errors, which cause inter-block discontinuity. This is also why some in-loop filters (e.g., a deblocking filter) exist. However, since the filtering process is also post-processing filtering, an image encoding/decoding process (a predictive encoding process in this example) may be before filtering is performed on a boundary between blocks.

Referring to FIG. 6, the neighboring block b may be a block located on the left side of the current block and also may be a block located on the lower left side. That is, since the block located on the left side of the current block and the block located on the lower left side of the current block form one block, there may be no boundary between the left block and the lower left block.

The neighboring blocks d and e may be blocks located on the upper left side of the current block, but the blocks located on the upper left side of the current block may include a plurality of blocks, and thus there may be boundaries between the blocks.

That is, when a comparison is made focusing on the size and shape of the current block, a large block may be likely to have no block deterioration caused by a block boundary in the block, and a small block may be likely to have block deterioration caused by a block boundary in the block. For this purpose, various cases for block-based filtering (partially applied filtering) (performed on neighboring blocks) other than filtering applied collectively to the reference pixels have been described through the above example. In the following example, pixel-based filtering for solving the above problem will be described.

Figure 7:
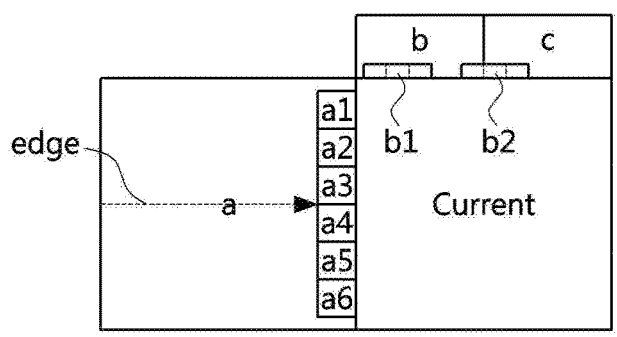
FIG. 7 is an example diagram illustrating an adaptive filtering method depending on the location of the reference pixel in intra-prediction according to an embodiment of the present invention.

FIG. 7 is an example diagram illustrating an adaptive filtering method depending on the location of the reference pixel in intra-prediction according to an embodiment of the present invention.

Referring to FIG. 7, it can be seen that, among neighboring blocks adjacent to a current block (Current), a block a located on the left side of the current block is equal in size to the current block and blocks b and c located on the upper side of the current block is smaller than the current block.

First, for the neighboring blocks b and c smaller than the current block, some pixels among the reference pixels belonging to the blocks b and c smaller than the current block may exist such as b1 and b2. In this case, it can be seen that b1 and b2 have a length corresponding to the number of filtering taps (e.g., a 3-tap filter is composed of three pixels, and in the drawing, it is shown that the 3-tap filter is applied) and reference pixels to be filtered depending on the number of filtering taps may be located on a boundary between blocks. That is, the reference pixels b1 are located in one neighboring block, and the reference pixels b2 may be located across the neighboring blocks b and c.

Generally, considering that the discontinuity of pixels on a boundary between blocks is large, it may not be proper to filter the reference pixels b2 located on the boundary between the blocks in the same manner as that of the reference pixels b1 located in any one block. Accordingly, filter coefficients different from those of the reference pixels b1 may be applied to the reference pixels b2 located on the boundary between the blocks. For example, a 3-tap filter [1, 2, 1]/4 may be applied to the reference pixels b1, and a 3-tap filter [1, 6, 1]/8 may be applied to the reference pixels b2. That is, since the reference pixels b2 are located across the block b and the block c, the filter coefficients may be changed in order to reduce pixel influence of any one of the two blocks. Also, a 3-tap filter may be applied to the reference pixels b1 located inside the block, and a different number of taps of the filter, i.e., a 5-tap filter may be applied to the reference pixels b2 located on the boundary between the blocks.

Next, for the neighboring block a equal in size to the current block, there may be an edge component in the neighboring block a. In this case, when filtering is collectively applied to all the reference pixels a1, a2, a3, a4, a5, and a6 belonging to the block having the edge component, the reference pixels may be inaccurately adjusted, thereby reducing the accuracy of the intra-prediction. Accordingly, when an edge component is present between reference pixels belonging to neighboring blocks larger than or equal in size to the current block, it is possible to omit to filter the reference pixels or apply another filter to the reference pixels. In summary, depending on the process, the filtering may not be applied, the filtering may continue to be applied, or other filtering may be applied.

In this case, a criterion for determining whether to have an edge may be determined as follows.

Referring to FIG. 7, it is assumed that it is determined whether six reference pixels of the neighboring block a have an edge. The determination may be made by comparing a value obtained using three consecutive pixels to a reference value and by comparing a value obtained using two consecutive pixels to a threshold value.

For example, an example in which the value obtained by using three consecutive pixels is compared to the threshold value is expressed by the following Equation 2.

$$d3a = \text{abs}(a1 - 2 \times a2 + a3) \quad \text{[Equation 2]}$$

Referring to Equation 2, a value d3a obtained by substituting pixel values of three consecutive pixels a1, a2, and a3 into Equation 2 and performing an absolute value operation (abs) may be found. In this case, by comparing the obtained value d3a to the threshold value, whether to have an edge may be determined.

$$d2 = \text{abs}(a3 - a4) \quad \text{[Equation 3]}$$

Referring to Equation 3, a value d2 obtained by substituting pixel values of two consecutive pixels a3 and a4 into the equation and performing an absolute value operation (abs) may be found. In this case, by comparing the obtained value d2 to the threshold value, whether to have an edge may be determined.

The method according to Equation 2 is not performed only once but in all the cases of selecting three consecutive pixel values from among the reference pixels in the neighboring block. Thus, it is possible to determine whether an edge is present between reference pixels in a specific neighboring block.

Also, the method according to Equation 3 is not performed only once but in all the cases of selecting two consecutive pixel values from among the reference pixels in the neighboring block. Thus, it is possible to determine whether an edge is present between reference pixels in a specific neighboring block.

Also, in order to determine whether to have an edge, the method of using two consecutive pixel values and the method of using three consecutive pixel values may be used in combination.

The above example is an example process of analyzing the characteristics of a reference pixel (determined in units of at least one pixel in this example) to determine whether to apply reference pixel filtering, the type of filtering, and the like. In detail, the above example is an example of detecting an edge component in the reference pixel. However, the present invention is not limited to the above example, and the determination may be made in various ways.

Figure 8:
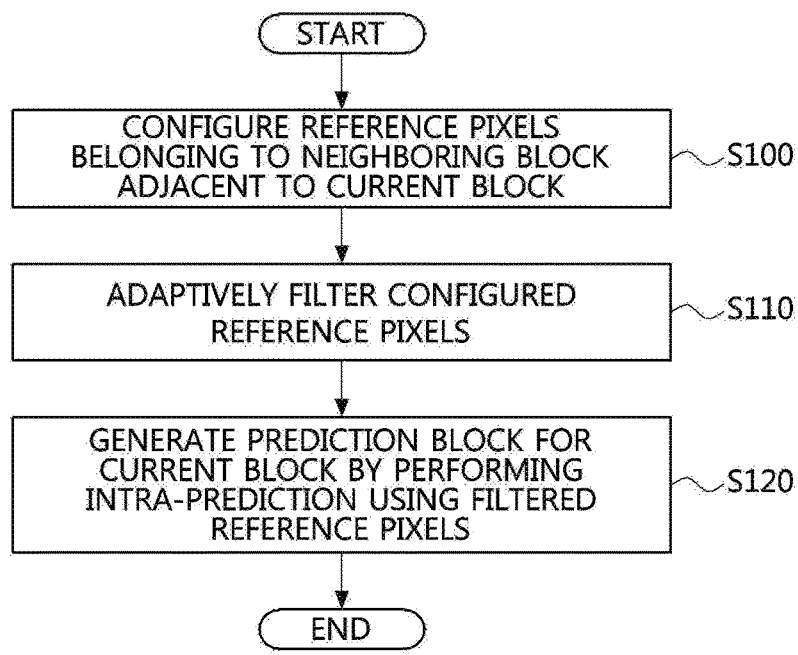
FIG. 8 is a flowchart showing an intra-prediction method for adaptively filtering a reference pixel according to an embodiment of the present invention.

FIG. 8 is a flowchart showing an intra-prediction method for adaptively filtering reference pixels according to an embodiment of the present invention.

Referring to FIG. 8, the intra-prediction method for adaptively filtering reference pixels may include configuring reference pixels belonging to a neighboring block adjacent to a current block (S100); adaptively filtering the configured reference pixels (S110); and generating a prediction block for the current block by performing intra-prediction using the filtered reference pixels (S120).

Here, the adaptive filtering (S110) may include performing adaptive filtering according to a relative size of the neighboring block with respect to the size of the current block.

Here, the adaptive filtering (S110) may include filtering the reference pixels by applying a filter weaker than a reference filter when the neighboring block is smaller than the current block.

Here, the adaptive filtering (S110) may include filtering the reference pixels by applying a filter stronger than the reference filter when the neighboring block is larger than the current block.

Here, the adaptive filtering (S110) may include filtering the reference pixels by applying the predetermined reference filter when the neighboring block is equal in size to the current block.

Here, the adaptive filtering (S110) may include performing adaptive filtering according to a relative size of the neighboring block when the current block is smaller than a predetermined size.

Here, the adaptive filtering (S110) may include filtering the reference pixels by applying a filter stronger than the reference filter without needing to consider the relative size of the neighboring block when the current block is larger than or equal in size to the predetermined size.

Here, the predetermined size may be one of 64×64, 32×32, 16×16, and 8×8.

Here, the adaptive filtering (S110) may be performed only when the minimum distance between the intra-prediction mode of the current block and the vertical mode or the horizontal mode is greater than or equal to a predetermined threshold value.

Here, the adaptive filtering (S110) may include filtering the reference pixels by changing coefficients or the number of taps of the reference filter when the neighboring block is smaller than the current block and the configured reference pixels are located on a boundary between two neighboring blocks.

Here, the adaptive filtering (S110) may include determining whether an edge is present between the reference pixels belonging to the neighboring block when the neighboring block is larger than or equal in size to the current block.

Here, the determining of whether an edge is present may include determining whether the edge is present depending on whether a first value obtained by using three consecutive pixels or two consecutive pixels among the reference pixels is greater than the threshold value.

Here, the adaptive filtering (S110) may include filtering only reference pixels belonging to a neighboring block with no edge.

Figure 9:
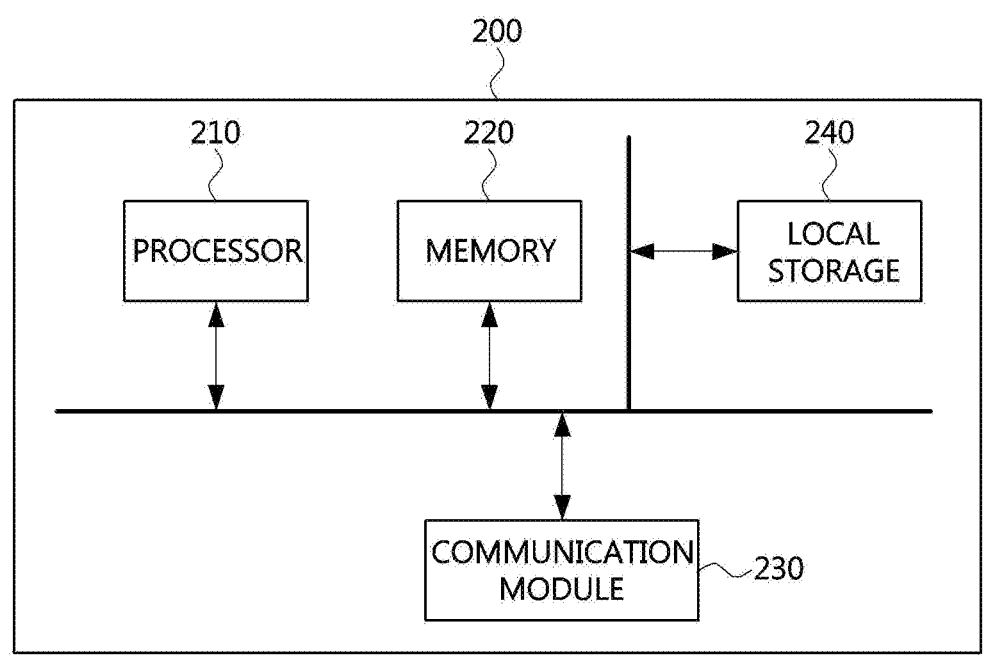
FIG. 9 is a block diagram showing an image decoding apparatus for performing intra-prediction according to an embodiment of the present invention.

FIG. 9 is a block diagram showing an image decoding apparatus for performing intra-prediction according to an embodiment of the present invention.

Referring to FIG. 9, an image decoding apparatus 200 may include at least one processor 210 and a memory 220 configured to store instructions for instructing the at least one processor 210 to perform at least one step.

Also, the image decoding apparatus 200 may further include a communication module 230 configured to receive a bitstream from the image encoding apparatus through a wired/wireless network.

Also, the image decoding apparatus 200 may further include a local storage 240 configured to store a restored reference picture or block, a decoded frame, or the like.

Here, the at least one step may include configuring reference pixels belonging to a neighboring block adjacent to a current block, adaptively filtering the configured reference pixels, and generating a prediction block for the current block by performing intra-prediction using the filtered reference pixels.

Here, the adaptively filtering may include performing adaptive filtering according to a relative size of the neighboring block with respect to the size of the current block.

Here, the adaptive filtering may include filtering the reference pixels by applying a filter weaker than a reference filter when the neighboring block is smaller than the current block.

Here, the adaptive filtering may include filtering the reference pixels by applying a filter stronger than the reference filter when the neighboring block is larger than the current block.

Here, the adaptive filtering may include filtering the reference pixels by applying the predetermined reference filter when the neighboring block is equal in size to the current block.

Here, the adaptive filtering may include performing adaptive filtering according to a relative size of the neighboring block when the current block is smaller than a predetermined size.

Here, the adaptive filtering may include filtering the reference pixels by applying a filter stronger than the reference filter without needing to consider the relative size of the neighboring block when the current block is larger than or equal in size to the predetermined size.

Here, the predetermined size may be one of 64×64, 32×32, 16×16, and 8×8.

Here, the adaptive filtering may be performed only when the minimum distance between the intra-prediction mode of the current block and the vertical mode or the horizontal mode is greater than or equal to a predetermined threshold value.

Here, the image decoding apparatus 200 may be, for example, a desktop computer, a laptop computer, a notebook, a smartphone, a tablet PC, a mobile phone, a smart watch, smart glasses, an e-book reader, a portable multimedia player (PMP), a portable game machine, a navigation device, a digital camera, a digital multimedia broadcasting (DMB) player, a digital audio recorder, a digital audio player, a digital video recorder, a digital video player, a personal digital assistant (PDA), or the like having a communication capability.

The methods according to the present invention may be implemented in the form of program instructions that are executable through various computer means and may be recorded on a computer-readable medium. The computer-readable medium may also include, alone or in combination with the program instructions, data files, data structures, and the like. The program instructions recorded on the computer-readable medium may be designed and configured specially for the present invention or may be known and available to those skilled in the field of computer software.

Examples of computer-readable media may include hardware devices that are specially configured to store and perform program instructions, such as read-only memory (ROM), random access memory (RAM), flash memory, and the like. Examples of program instructions may include machine code, such as produced by a compiler, and higher level code that may be executed by a computer using an interpreter. The described hardware devices may be configured to act as one or more software modules in order to perform the operations of the present invention, or vice versa.

Furthermore, the above-mentioned method or apparatus may be implemented by all or some of the elements or functions being combined or separated.

While the present invention has been particularly shown and described with reference to exemplary embodiments thereof, it will be understood by those skilled in the art that various changes in form and details may be made therein without departing from the spirit and scope of the invention as defined in the following claims.

The invention claimed is:

1. An image decoding method for adaptively filtering a reference pixel, the image decoding method comprising:
   configuring reference pixels belonging to a neighboring block adjacent to a current block;
   determining, based on a product of a width and a height of the current block, whether to perform filtering on the configured reference pixels,
   based on the product being greater than a predetermined threshold, filtering the configured reference pixels and generating a prediction block for the current block by performing intra-prediction using the filtered reference pixels; and
   based on the product being less than or equal to the predetermined threshold, generating the prediction block for the current block by performing the intra-prediction without filtering the configured reference pixels,
   wherein the predetermined threshold is 32.

2. The image decoding method of claim 1, wherein whether to perform the filtering is determined by further considering a prediction mode of the current block.

3. An image encoding method for adaptively filtering a reference pixel, the image encoding method comprising:
   configuring reference pixels belonging to a neighboring block adjacent to a current block;
   determining, based on a product of a width and a height of the current block, whether to perform filtering on the configured reference pixels;
   based on the product being greater than a predetermined threshold, filtering the configured reference pixels and generating a prediction block for the current block by performing intra-prediction using the filtered reference pixels; and
   based on the product being less than or equal to the predetermined threshold, generating the prediction block for the current block by performing the intra-prediction without filtering the configured reference pixels,
   wherein the predetermined threshold is 32.

4. The image encoding method of claim 3, wherein whether to perform the filtering is determined by further considering a prediction mode of the current block.

5. A non-transitory computer readable medium having stored thereon instructions that when executed by a processor perform a method including:
   configuring reference pixels belonging to a neighboring block adjacent to a current block;
   determining, based on a product of a width and a height of the current block, whether to perform filtering on the configured reference pixels,
   based on the product being greater than a predetermined threshold, filtering the configured reference pixels and generating a prediction block for the current block by performing intra-prediction using the filtered reference pixels; and
   based on the product being less than or equal to the predetermined threshold, generating the prediction block for the current block by performing the intra-prediction without filtering the configured reference pixels,
   wherein the predetermined threshold is 32.

* * * * *